(12) United States Patent
Konstandopoulos et al.

(10) Patent No.: US 8,038,955 B2
(45) Date of Patent: Oct. 18, 2011

(54) CATALYST SUPPORTING HONEYCOMB AND METHOD OF MANUFACTURING THE SAME

(75) Inventors: Athanasios G. Konstandopoulos, Thessaloniki (GR); Kazushige Ohno, Ibi-gun (JP); Tomokazu Oya, Ibi-gun (JP); Kazutake Ogyu, Ibi-gun (JP)

(73) Assignees: Ibiden Co., Ltd., Ogaki-Shi (JP); Athanasios G. Konstandopoulos, Thessaloniki (GR)

( * ) Notice: Subject to any disclaimer, the term of this patent is extended or adjusted under 35 U.S.C. 154(b) by 57 days.

(21) Appl. No.: 12/046,842

(22) Filed: Mar. 12, 2008

(65) Prior Publication Data

US 2008/0260991 A1    Oct. 23, 2008

(30) Foreign Application Priority Data

Apr. 17, 2007 (JP) ............... PCT/JP2007/058375

(51) Int. Cl.
*B01D 50/00* (2006.01)
(52) U.S. Cl. ............................................. 422/180
(58) Field of Classification Search .............. 422/168, 422/177, 180; 502/300, 302, 304
See application file for complete search history.

(56) References Cited

U.S. PATENT DOCUMENTS

| | | | |
|---|---|---|---|
| 4,746,537 A | 5/1988 | Takeuchi et al. | |
| 6,939,825 B1 | 9/2005 | Ohno et al. | |
| 7,119,046 B2 | 10/2006 | Ohno et al. | |
| 7,196,037 B2 | 3/2007 | Ohno et al. | |
| 7,223,716 B1* | 5/2007 | Koike et al. | 502/439 |
| 7,250,385 B1 | 7/2007 | Ohno et al. | |
| 2002/0039964 A1 | 4/2002 | Tanaka et al. | |
| 2003/0100446 A1* | 5/2003 | Hase et al. | 502/302 |
| 2003/0165638 A1* | 9/2003 | Louks et al. | 427/600 |
| 2004/0033175 A1 | 2/2004 | Ohno et al. | |
| 2004/0176246 A1 | 9/2004 | Shirk et al. | |
| 2005/0102987 A1 | 5/2005 | Kudo | |
| 2005/0169818 A1 | 8/2005 | Ohno et al. | |
| 2005/0227869 A1 | 10/2005 | Ohno et al. | |
| 2005/0266991 A1 | 12/2005 | Ohno et al. | |
| 2005/0266992 A1 | 12/2005 | Ohno et al. | |
| 2006/0075731 A1 | 4/2006 | Ohno et al. | |
| 2006/0172113 A1 | 8/2006 | Kunieda | |
| 2006/0177629 A1 | 8/2006 | Kunieda | |
| 2006/0188415 A1 | 8/2006 | Ohno et al. | |
| 2006/0194018 A1 | 8/2006 | Ohno et al. | |
| 2006/0263574 A1 | 11/2006 | Tsunekawa et al. | |
| 2006/0292044 A1 | 12/2006 | Ohno et al. | |
| 2006/0292330 A1 | 12/2006 | Ohno et al. | |
| 2006/0292331 A1 | 12/2006 | Ohno et al. | |
| 2006/0292332 A1 | 12/2006 | Ohno et al. | |

(Continued)

FOREIGN PATENT DOCUMENTS

EP    1243335    9/2002

(Continued)

*Primary Examiner* — Tom Duong
(74) *Attorney, Agent, or Firm* — Ditthavong Mori & Steiner, P.C.

(57) ABSTRACT

A catalyst supporting honeycomb including a pillar-shaped honeycomb structure having a plurality of cells formed in parallel with one another in a longitudinal direction with a cell wall interposed therebetween, and catalyst particles supported on the honeycomb structure. The catalyst particles include an oxide catalyst, an average particle diameter of which is at least about 0.05 μm and at most about 1.00 μm.

5 Claims, 5 Drawing Sheets

U.S. PATENT DOCUMENTS

| | | |
|---|---|---|
| 2006/0292333 A1 | 12/2006 | Ohno et al. |
| 2006/0292334 A1 | 12/2006 | Ohno et al. |
| 2006/0292335 A1 | 12/2006 | Ohno et al. |
| 2006/0292336 A1 | 12/2006 | Ohno et al. |
| 2006/0292337 A1 | 12/2006 | Ohno et al. |
| 2006/0292338 A1 | 12/2006 | Ohno et al. |
| 2006/0292339 A1 | 12/2006 | Ohno et al. |
| 2006/0292340 A1 | 12/2006 | Ohno et al. |
| 2006/0292341 A1 | 12/2006 | Ohno et al. |
| 2006/0292342 A1 | 12/2006 | Ohno et al. |
| 2006/0292393 A1 | 12/2006 | Kunieda |
| 2007/0004592 A1 | 1/2007 | Ohno et al. |
| 2007/0004593 A1 | 1/2007 | Ohno et al. |
| 2007/0020155 A1 | 1/2007 | Ohno et al. |
| 2007/0039295 A1 | 2/2007 | Ohno |
| 2007/0077190 A1 | 4/2007 | Ohno |
| 2008/0017572 A1 | 1/2008 | Kudo |
| 2008/0118682 A1 | 5/2008 | Ido et al. |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0241465 A1 | 10/2008 | Ido |
| 2008/0241467 A1 | 10/2008 | Ohno et al. |
| 2008/0260991 A1 | 10/2008 | Konstandopoulos et al. |

FOREIGN PATENT DOCUMENTS

| | | |
|---|---|---|
| EP | 1726698 | 11/2006 |
| EP | 1787710 | 5/2007 |
| JP | 61-268356 | 11/1986 |
| JP | 62004441 A * | 1/1987 |
| JP | 2995608 B2 | 5/1996 |
| JP | 2002-361047 | 12/2002 |
| JP | 2004-033995 | 2/2004 |
| JP | 2004-058013 | 2/2004 |
| JP | 2004-255299 | 9/2004 |
| JP | 2005-349378 | 12/2005 |
| WO | WO 2005/000445 | 1/2005 |
| WO | WO 2005/005018 | 1/2005 |
| WO | WO 2007/010643 | 1/2007 |

* cited by examiner

|  | 350°C | 450°C | 550°C |
|---|---|---|---|
| Example 1<br>Comparative Example 2 | 18cm/s | 30cm/s | 45cm/s |
| Comparative Example 1 | 2.9cm/s | 4.8cm/s | 7.2cm/s |

US 8,038,955 B2

CATALYST SUPPORTING HONEYCOMB AND METHOD OF MANUFACTURING THE SAME

CROSS-REFERENCE TO RELATED APPLICATIONS

This present application claims priority under 35 U.S.C. §119 to PCT Application No. PCT/JP2007/058375, filed Apr. 17, 2007, the contents of which are incorporated herein by reference in their entirety.

BACKGROUND OF THE INVENTION

1. Field of the Invention

The present invention relates to a catalyst supporting honeycomb and a method of manufacturing the same.

2. Discussion of the Background

There has been known a catalyst supporting honeycomb which converts exhaust gases by allowing the exhaust gases to contact with a catalyst supported on cell walls of a honeycomb structure which is mainly made of inorganic fibers. With regard to a catalyst supporting honeycomb disclosed in WO 2007/10643 A1, a catalyst is supported on a honeycomb structure by impregnating the honeycomb structure in a catalyst solution in a slurry state, and then heating the honeycomb structure.

The contents of WO 2007/10643 A1 are incorporated herein by reference in their entirety.

SUMMARY OF THE INVENTION

A catalyst supporting honeycomb of the present invention includes a pillar-shaped honeycomb structure having a plurality of cells formed in parallel with one another in a longitudinal direction with a cell wall interposed therebetween; and catalyst particles supported on the honeycomb structure. The honeycomb structure primarily includes inorganic fibers. The catalyst particles are configured by an oxide catalyst having an average particle diameter of at least about 0.05 μm and at most about 1.00 μm.

A method for manufacturing a catalyst supporting honeycomb of the present invention includes manufacturing a honeycomb structure having a plurality of cells formed in parallel with one another in a longitudinal direction with a cell wall interposed therebetween. The cell wall primarily includes inorganic fibers. The method further includes dispersing a solution of a precursor of a catalyst in a gas; flowing a gas containing the dispersed solution of the precursor of the catalyst into the honeycomb structure; and heating the honeycomb structure so that the precursor of the catalyst is formed into catalyst particles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1A:
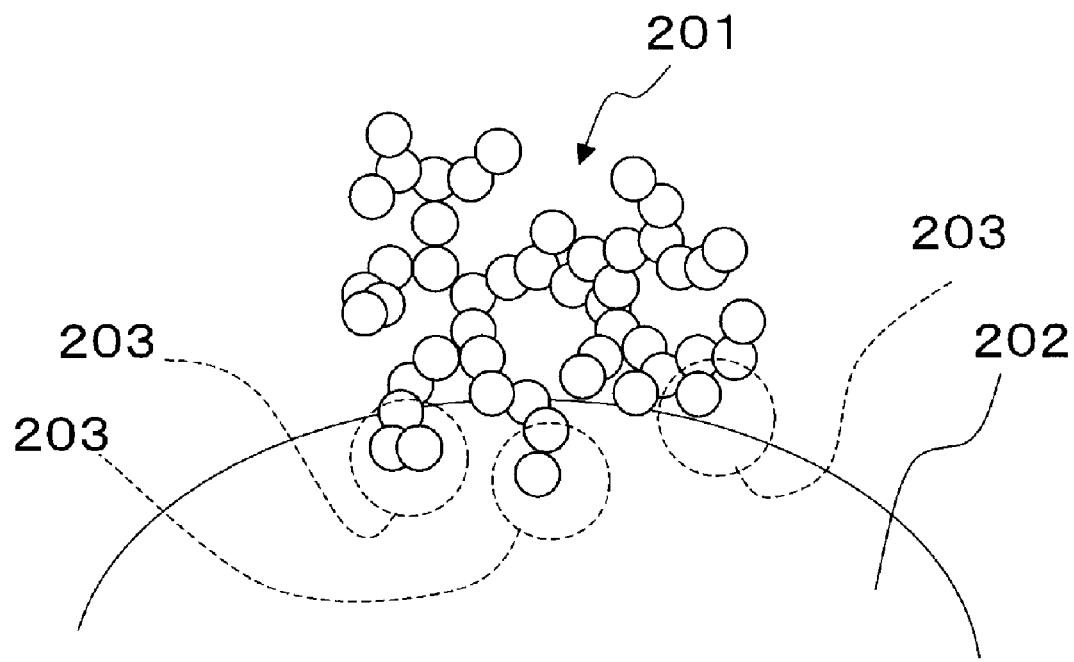
FIG. 1A shows a state of catalysts supported by a conventional method and soot.

The embodiments will now be described with reference to the accompanying drawings, wherein like reference numerals designate corresponding or identical elements throughout the various drawings.

According to an embodiment of the present invention, oxide catalyst particles are supported on a pillar-shaped honeycomb structure primarily comprising inorganic fibers, in which a plurality of cells are formed in parallel with one another in a longitudinal direction with a cell wall interposed therebetween, and the average particle diameter of the oxide catalyst particles is set to at least about 0.05 μm and at most about 1.00 μm.

In the embodiment of the present invention, since either of two end portions of each cell is sealed, cell walls of the catalyst supporting honeycomb function as filter for capturing soot.

Figure 1B:
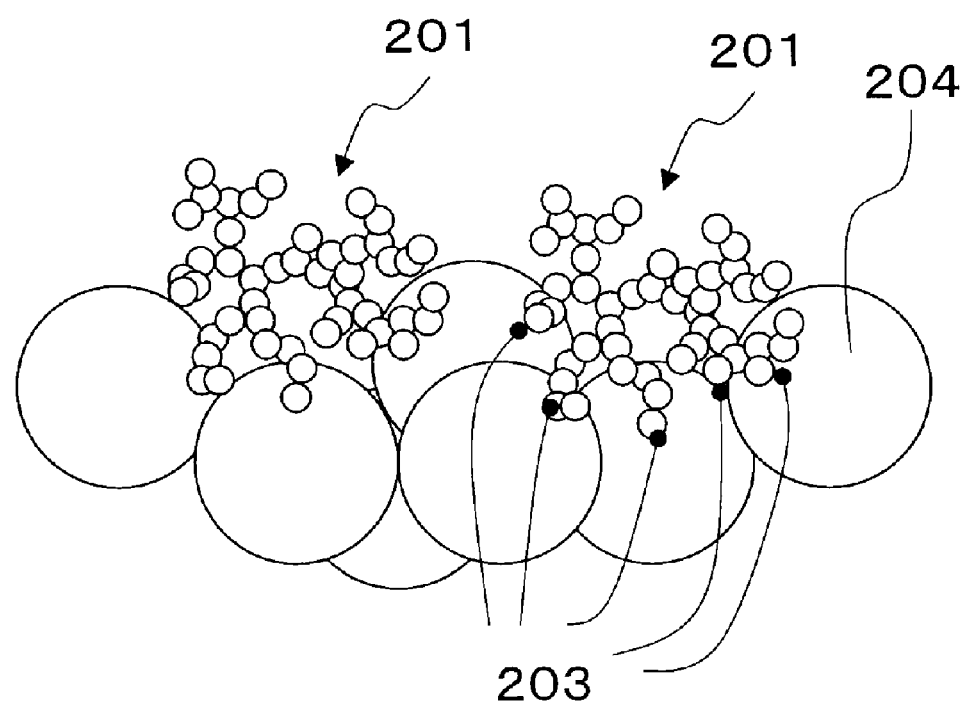
FIG. 1B shows a state of the catalysts supported by an embodiment of the present invention and soot.

In the embodiment of the present invention, the average particle diameter of the oxide catalyst particles 204 supported thereon is set to at least about 0.05 μm and at most about 1.00 μm, which is almost the same as an average particle diameter of the secondary particles of soot. Therefore, the activity points between the secondary particles of soot and the catalyst particles 204 can be increased as shown in FIG. 1B. In other words, the soot and the catalyst can easily contact with each other, with the result that the soot combustion behavior by active oxygen induced by the oxide catalyst can be more easily improved.

This behavior, in addition to the forced regeneration of soot flowed into the catalyst supporting honeycomb, makes it easier to combust soot as compared with the catalyst supporting honeycomb of WO 2007/10643 A1. As a result, it becomes easier to reduce an increase with time in the pressure loss upon an influx of soot.

Normally, the average diameter of secondary particles of soot in exhaust gases is about 0.1 μm. However, in the catalyst supporting honeycomb disclosed in WO 2007/10643 A1, since the honeycomb structure has been impregnated in the catalyst solution in a slurry state, the diameter of the supported catalyst particles 202 tends to be much larger than the diameter of the secondary particles 201 of soot as shown in FIG. 1A. Accordingly, this prior art tends to have a problem that, due to few activity points 203 between the catalyst particles and the secondary particles of soot, soot combustion behavior by active oxygen induced by an oxide catalyst cannot be fully exerted.

Accordingly, soot captured by the catalyst supporting honeycomb of this kind becomes less likely to be combusted, except for by forced regeneration using high temperature exhaust gases. Therefore, soot is easily accumulated on cell walls, causing a problem of increase with time in the pressure loss due to an influx of soot into the catalyst supporting honeycomb.

According to the embodiment of the present invention, it becomes easier to suppress an increase with time in the pressure loss upon an influx of soot into catalyst supporting honeycombs in which a catalyst is supported, by allowing soot that has been flowed in to more easily contact with the catalyst with each other so as to improve the soot combustion behavior by active oxygen induced by the oxide catalyst.

Meanwhile, in the embodiment of the present invention, even in the case where the end portion is not sealed, the exhaust gas converting performance can be more easily improved due to the increased chance of contact between exhaust gases and the catalyst.

In the embodiment of the present invention, the catalyst supporting honeycomb can also be concretely configured by a honeycomb structure in which a plurality of lamination members are laminated with one another in a longitudinal direction, and the lamination members are laminated so that the cells of each lamination member are aligned with the cells of the other lamination members.

Moreover, in the embodiment of the present invention, the porosity of the cell wall is about 70% or more. With this structure, soot can be more easily flowed into deep portions of the cell walls. Accordingly, the catalyst supported inside the cell walls can be more easily contacted with the soot, resulting in improved combustion of the soot that has flowed into the catalyst supporting honeycomb. This effect makes it possible to extend a time period during which soot is flowed into deep portions of the cell walls, and consequently a time period before a surge of pressure loss can be prolonged.

Further, in the embodiment of the present invention, when the oxide catalyst is at least one member selected from the group consisting of $CeO_2$, $ZrO_2$, $FeO_2$, $Fe_2O_3$, $CuO$, $CuO_2$, $Mn_2O_3$, $MnO$, $K_2O$, and a composite oxide represented by a composition formula $A_nB_{1-n}CO_3$ (in which A represents La, Nd, Sm, Eu, Gd or Y; B represents an alkali metal or an alkali earth metal; C represents Mn, Co, Fe or Ni), a catalyst which is excellent in active oxygen delivery performance can be supported on the catalyst supporting honeycomb. As a result of this, in particular, the soot combustion function of the catalyst supporting honeycomb can be more easily improved.

Furthermore, in the embodiment of the present invention, when a gas containing a dispersed solution of a precursor of an oxide catalyst is flowed into a pillar-shaped honeycomb structure configured by a plurality of cells formed in parallel with one another in a longitudinal direction with a cell wall, which primarily includes inorganic fibers, interposed therebetween, the catalyst supporting honeycomb, in which the oxide catalyst particles are supported on the cell walls, can show the same effects as those specifically described above.

Moreover, by employing a method of manufacturing a catalyst supporting honeycomb according to the embodiment of the present invention, which includes processes of: manufacturing a honeycomb structure configured by a plurality of cells formed in parallel with one another in a longitudinal direction with a cell wall, which primarily includes inorganic fibers, interposed therebetween; dispersing a solution of a precursor of a catalyst in a gas; flowing a gas containing the dispersed solution of the precursor of the catalyst into the honeycomb structure; and heating the honeycomb structure so that the precursor of the catalyst is formed into catalyst particles, it is possible to manufacture a catalyst supporting honeycomb which can show the same effects as those specifically described above.

In the following, a plurality of embodiments of the present invention are described with reference to drawings.

First Embodiment

The following description will discuss a honeycomb structure primarily comprising inorganic fibers according to a first embodiment of the present invention with reference to drawings.

The honeycomb structure according to the present embodiment is configured by inorganic fibers and inorganic material, and the inorganic fibers are fixed to each other through the inorganic material. Here, portions where the inorganic fibers are fixed to each other are mainly intersection portions of the inorganic fibers, and the inorganic material is preferably present locally at the intersection portions of the organic fibers. Preferably, the inorganic material fixes the intersection portions of the inorganic fibers by vitrification. Here, the honeycomb structure according to the present embodiment is an integral honeycomb structure comprising a single member.

Figure 2:
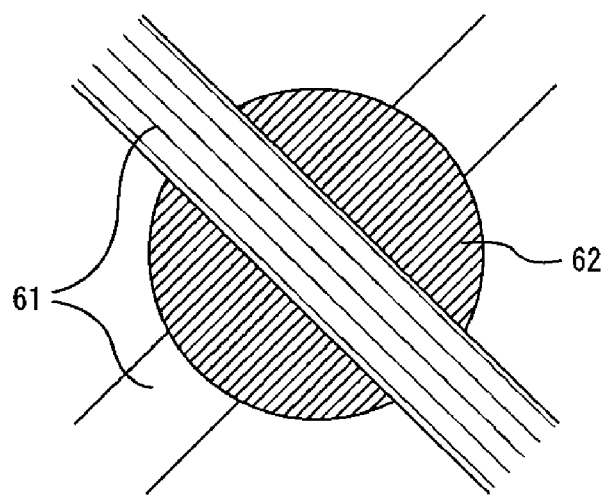
FIG. 2 is a cross sectional diagram that schematically illustrates a portion of the inorganic fiber forming the honeycomb structure according to the embodiment of the present invention.

FIG. 2 is a cross sectional diagram that schematically illustrates a portion of the inorganic fiber forming the honeycomb structure according to the present embodiment. Here, the cross sectional diagram shown in FIG. 2 is a cross sectional diagram obtained by cutting the crossing inorganic fibers in a length direction.

When inorganic material 62 is fixed to an intersection portion of inorganic fibers 61 which form the honeycomb structure as shown in FIG. 2, the inorganic material 62 fixed to the intersection portion functions to bond the two inorganic fibers at the intersection portion. The fixing portion is present not only at one site but also at two or more sites per one inorganic fiber, causing complex intertwining of many fibers, and therefore, separation of the inorganic fibers can be avoided. Moreover, strength of the honeycomb structure is improved.

In the case where the inorganic material 62 is locally present at the intersection portions of inorganic fibers 61, in many of the inorganic fibers 61, intersection portions with other organic fibers 61 are coated with the organic material 62, and almost no inorganic material is fixed to most of the rest portions of the inorganic fibers 61.

Here, the intersection portion of the inorganic fibers refers to an area within a distance of about ten times of the fiber diameter of the inorganic fibers from the portion where inorganic fibers are most close to each other.

The above-mentioned honeycomb structure is configured by inorganic fibers and inorganic material. Examples of the inorganic fibers include: an oxide ceramic such as silica-alumina, mullite, alumina, silica, titania and zirconia; a nitride ceramic such as silicon nitride and boron nitride; a carbide ceramic such as silicon carbide; basalt, and the like. Each of these materials may be used alone, or two or more of them may be used in combination.

An example of the inorganic material includes inorganic material that melts at a temperature at which the inorganic fibers neither melt nor sublime. Moreover, the inorganic material preferably includes inorganic material that melts at a temperature of the heat-resistant temperature of the inorganic fibers or lower.

Here, in consideration of the temperature at which the inorganic fibers to be combined melt or sublime, the heat resistance temperature of the inorganic fibers or the like, for example, those inorganic materials which melt at a temperature of the heat-resistant temperature of the inorganic fibers or less may be used. More specifically, for example, in the case where alumina is used as the inorganic fibers, those inorganic materials which melt at about 1300° C. or less may be used.

With respect to the inorganic material, those containing silica are preferably used, and specific examples of the inorganic material containing silica include inorganic glass such as silicate glass, silicate alkali glass and borosilicate glass, and the like.

With respect to the porosity of the cell walls of the honeycomb structure according to the embodiment of the present invention, the desirable lower limit is about 70%, and the desirable upper limit is about 95%. When the porosity is about 70% or more, soot tends to enter into inner portions of pores, and as a result, those catalysts supported on the inner portions of the cell walls of the honeycomb structure tend to contact with soot. On the other hand, when the porosity is about 95% or less, the ratio occupied by pores tends not increase, and therefore it becomes easier to maintain the strength of the honeycomb structure as a whole.

In the honeycomb structure according to the embodiment of the present invention, an average pore diameter is not specifically limited, and the desirable lower limit is about 10 μm, and the desirable upper limit is about 100 μm. When the average pore diameter is about 10 μm or more, the catalyst is more easily supported on the inner portions of the cell walls, and also soot may be more easily filtered at the deep inside the cell walls, with the result that the soot is more easily made in contact with the catalyst supported on the inner portions of the cell walls. On the other hand, when the average pore diameter is about 100 μm or less, a catalyst or soot may not easily pass through the pores, and thus more easily function as a filter.

Here, the above-mentioned porosity and pore diameter can be measured through known methods, such as a measuring method using a mercury porosimeter, Archimedes method and a measuring method using a scanning electron microscope (SEM).

With regard to the aperture ratio of the honeycomb structure according to the embodiment of the present invention, the desirable lower limit is about 30%, and the desirable upper limit is about 60%. When the aperture ratio is about 30% or more, the pressure loss tends not become high when exhaust gases flow into and out of the honeycomb structure. When the aperture ratio is about 60% or less, the strength of the honeycomb structure becomes less likely to be reduced.

A method of manufacturing the honeycomb structure according to the present embodiment includes process of: mixing inorganic fibers A with inorganic fibers B and/or inorganic particles C, both of which melt at a temperature at which the inorganic fibers A neither melt nor sublime; extrusion-molding a mixture obtained by the above-mentioned mixing process through a die in which predetermined holes are formed to form a pillar-shaped molded body with a number of cells formed in the longitudinal direction; and carrying out a heating treatment on the molded body at a temperature of the heat-resistant temperature of the inorganic fibers A or less and at the same time at a temperature of the softening temperature of the inorganic fibers B and/or the inorganic particles C or more.

The following description will discuss the above-mentioned manufacturing method of the honeycomb structure in order of the processes. First, a mixing process is carried out by mixing the inorganic fibers A with the inorganic fibers B and/or the inorganic particles C, both of which melt at a temperature at which the inorganic fibers A neither melt nor sublime, so as to prepare a mixture.

The same inorganic fibers exemplified in the description of the honeycomb structure mentioned above can be used as the inorganic fibers A. The preferable examples thereof include at least one member selected from the group consisting of silicon carbide, alumina, basalt, silica, silica-alumina, titania and zirconia, because this arrangement makes it possible to manufacture a honeycomb structure having excellent heat resistance.

The inorganic fibers B and/or the inorganic particles C are not particularly limited as long as the inorganic fibers and/or the inorganic particles melt at a temperature at which the inorganic fibers A do not melt. Specifically, examples of the inorganic fibers B include inorganic glass fibers comprising silicate glass, silicate alkali glass, borosilicate glass and the like, or the like, and examples of the inorganic particles C include inorganic glass particles comprising silicate glass, silicate alkali glass, borosilicate glass and the like, or the like.

When the inorganic fibers A is mixed with the inorganic fibers B and/or the inorganic particles C, the blending ratio (weight ratio) between the inorganic fibers A and a total amount of the inorganic fibers B and the inorganic particles C preferably is at least about (2:8) and at most about (8:2). When the blending ratio of the inorganic fibers A is about (2:8) or more, the inorganic material is less likely to fix to the inorganic fibers in a manner as to coat the surface of the inorganic fibers, and thus flexibility in the resulting honeycomb structure is more likely to be sufficient. In contrast, when the blending ratio of the inorganic fibers A is about (8:2) or less, the fixing portions between the inorganic fibers are less likely to decrease, and thus strength in the resulting honeycomb structure is more likely to be sufficient.

Here, in preparation of the above-mentioned mixture, a liquid medium such as water, or a dispersant may be added thereto, if necessary, so as to uniformly mix the inorganic fibers A with the inorganic fibers B and/or the inorganic particles C. Moreover, an organic binder may be added thereto. When the inorganic binder is added, the inorganic fibers A can be surely entangled with the inorganic fibers B and/or the inorganic particles C so that, even prior to a firing process, the inorganic fibers B and/or the inorganic particles C are made to be hardly drawn off from the inorganic fibers A; thus, it becomes easier to more surely fix the inorganic fibers A to one another.

Examples of the organic binder include: an acrylic binder, ethyl cellulose, butyl cellosolve, polyvinyl alcohol and the like. One kind of these organic binders may be used, or two or more kinds of these may be used in combination. In addition, if necessary, a plasticizer, a lubricant, a molding auxiliary, a pore-forming agent and the like may be added thereto. With respect to the plasticizer and the lubricant, those conventionally used may be applied.

The thus obtained mixture is preferably allowed to have such properties that the homogeneous composition is maintained for a long time and that the inorganic fibers and the like are prevented from precipitating, and further, the mixture is preferably allowed to have a degree of viscosity that can maintain the predetermined shape in the succeeding molding process.

Next, an extrusion-molding process is carried out on the mixture obtained in the above-mentioned mixing process. In this extrusion-molding process, the mixture is continuously extruded by using a die in which predetermined holes are formed so as to form a pillar-shaped molded body with a large number of cells formed in the longitudinal direction.

The apparatus to be used in the extrusion-molding process is not particularly limited, and for example, a single-axis screw-type extrusion-molding machine, a multi-axis screw-type extrusion-molding machine, a plunger-type molding machine and the like may be used. Among these, in particular, the plunger-type molding machine is preferably used.

With reference to the drawings, the following description will discuss a plunger-type molding machine to be used in the present process and the application example thereof, although not limited to those systems.

Figure 3:
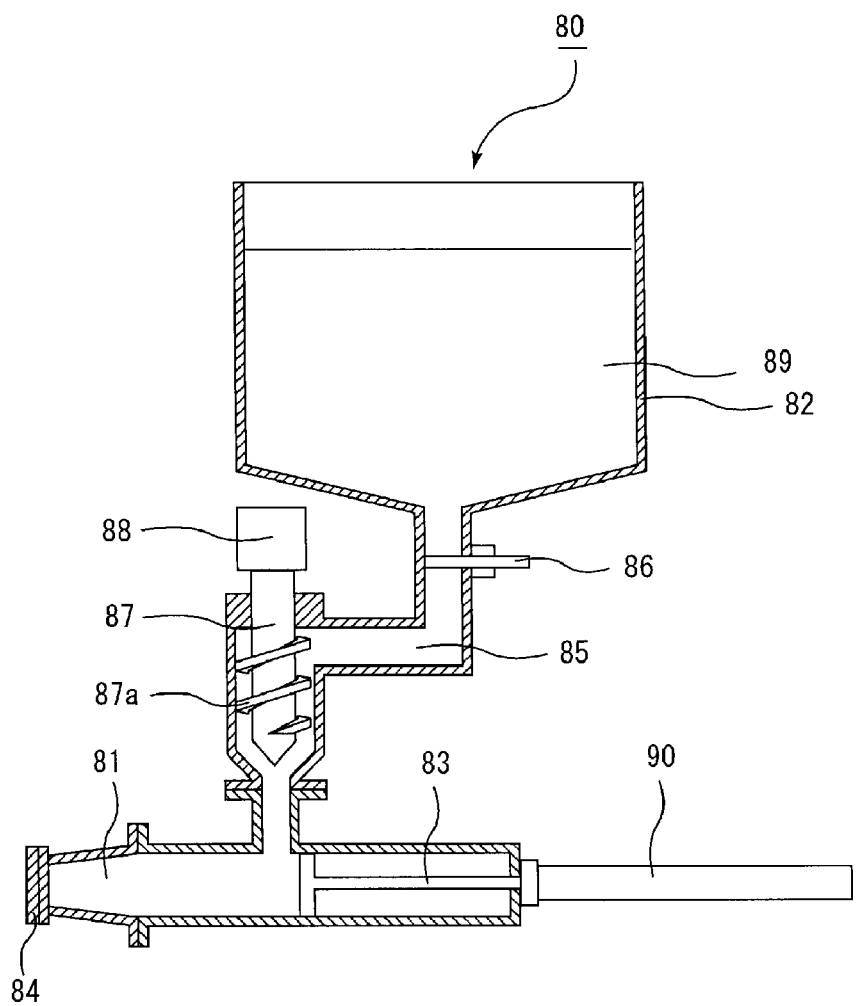
FIG. 3 is a cross-sectional diagram that schematically illustrates a plunger-type molding machine to be used for molding a pillar-shaped molded body.

FIG. 3 is a cross-sectional diagram that schematically illustrates a plunger-type molding machine to be used for molding a pillar-shaped molded body.

This plunger-type molding machine 80 is formed by a cylinder 81, a piston 83 provided with a mechanism capable of reciprocally moving between the front side and the rear side in the cylinder (horizontal direction in the figure), a die 84 that is attached to the tip of the cylinder and has holes formed therein for extrusion-molding a pillar-shaped molded body with a large number of cells formed in the longitudinal direction, and a mixture tank 82 placed on the upper portion of the cylinder 81, to which a pipe 85 is connected from the cylinder 81. Moreover, a shutter 86 is placed right below the mixture tank 82 so that the charging operation of the mixture from the mixture tank 82 can be interrupted. Here, a screw 87 with blades 87a is attached to the pipe 85, and allowed to rotate by a motor 88. The size of the blade 87a is set to virtually the same as the diameter of the pipe so that the mixture 89 is hardly allowed to flow reversibly. The mixture prepared in the above-mentioned mixing process is loaded into the mixture tank 82.

In manufacturing a molded body by using the plunger-type molding machine 80, first, the shutter 86 is opened, and the mixture, obtained in the mixing process, is charged into the cylinder 81 from the mixture tank 82 by rotating the screw. At this time, the piston 83 is moved to the end portion of the cylinder 81 on the right side in FIG. 3 according to the amount of the charge.

When the cylinder 81 is filled in with the mixture, the shutter 86 is closed and the rotation of the screw 87 is simultaneously stopped. When the piston 83 is pressed and shoved into the die side with the inside of the cylinder 81 filled with the mixture 89, the mixture is extruded through the die 84 so that a pillar-shaped molded body in which a plurality of cells are formed with a wall portion therebetween is continuously formed. At this time, according to the shape of the hole formed in the die, cells having the corresponding shape are formed. By repeating these processes, a molded body can be manufactured. Depending on the viscosity and the like, a molded body can be continuously manufactured, by rotating the screw 87 while the cylinder 83 is stopped.

Here, in the plunger-type molding machine 80 illustrated in FIG. 3, an oil cylinder 80 is used as the driving source used for shifting the piston 83; however, an air cylinder may be used, or a ball screw or the like may also be used.

The shape of the cells to be formed through the extrusion-molding process can be desirably selected by changing the shape of holes to be formed in the die.

The shape on the vertical cross section of each of the cells is not particularly limited to a tetragonal shape, and any desired shape such as a triangular shape, a hexagonal shape, an octagonal shape, a dodecagonal shape, a round shape, an elliptical shape and a star shape may be listed.

Moreover, molded bodies having various outer shapes can be manufactured by changing the shape of the die. The vertical cross-sectional shape of the honeycomb structure is not limited to a round shape, and various shapes such as a rectangular shape may be used; however, it is preferable to use a shape enclosed only by a curved line or by curved lines and straight lines. Specific examples thereof include, in addition to a round shape, a rectangular pillar shape, an elongated round shape (racetrack shape), a shape in which one portion of a simple closed curved line such as a rectangular pillar shape or a racetrack shape has a recess portion (concave shape), and the like.

Next, heating treatment is carried out on the molded body obtained in the above-mentioned extrusion-molding process. In this heating treatment process, the molded body is heated at a temperature of the heat-resistant temperature of the inorganic fibers A or less and at the same time at the softening temperature of the inorganic fibers B and/or the inorganic particles C or more; thus, a honeycomb structure is obtained.

By carrying out this heating treatment, it is possible to manufacture a honeycomb structure in which the inorganic fibers A are firmly fixed to one another through an inorganic material comprising the same material as the inorganic fibers B and/or the inorganic particles C, and most of the firmly fixed portions are the intersections of the inorganic fibers A, and the inorganic materials comprising the same material as the inorganic fibers B and/or the inorganic particles C are locally present at the intersections.

Here, the heating temperature is appropriately determined by taking into consideration the combination of the inorganic fibers A with the inorganic fibers B and/or the inorganic particles C.

Examples of the heat-resistant temperature of the inorganic fibers A are given as follows: alumina>about 1300° C., silica>about 1000° C., silicon carbide>about 1600° C., and silica-alumina>about 1200° C.

The specific heating temperature cannot be unconditionally determined because it depends on the heat-resistant temperature and the softening temperature of the inorganic fibers and the inorganic particles, and it is preferably set to at least about 900° C. and at most about 1050° C. in the case where inorganic glass is used as the inorganic fibers B and/or the inorganic particles C.

Additionally, prior to the heating treatment process, it is preferable to carry out a cutting process for cutting the manufactured molded body into a predetermined length, a drying process for removing moisture from the molded body and a degreasing process for removing organic materials from the molded body.

The cutting member to be used in the cutting process is not particularly limited, and for example, a cutter having a blade formed in the cutting portion, a laser beam, a linear member, or the like may be used. Moreover, a cutter that uses a rotary disc for cutting may also be used.

Moreover, another preferable cutting method is proposed in which to the end to which the molded body molded in the extrusion-molding process is transferred, a molded body cutting machine provided with a cutting means such as a laser and a cutter is installed, and while the cutting means is being transferred at a speed synchronous to the extruding speed of the molding body, the molded body is cut by the cutting means.

By using the cutting apparatus having the above-mentioned mechanism, it is possible to carry out the cutting process continuously, and consequently to improve the mass productivity.

With respect to the drying apparatus used for the drying process, although not particularly limited, for example, a microwave heat drying apparatus, a hot-air drying apparatus, an infrared ray drying apparatus or the like may be used, and a plurality of these apparatuses may be used in combination.

For example, in the case of using a hot-air drying apparatus, the drying process is preferably carried out at a set temperature of at least about 100° C. and at most about 150° C. for at least about 5 minutes and at most about 60 minutes under the atmospheric condition. In this case, the arrangement is preferably made so that the hot air is directed to the molded body in parallel with the longitudinal direction thereof so as to allow the hot air to pass through the cells. By allowing the hot air to pass through the cells of the molded body, the drying process of the molded body is carried out efficiently.

Normally, the degreasing process is preferably carried out in an oxidizing atmosphere such as normal atmosphere so as to oxidatively decompose the organic substances. The degreasing furnace is not particularly limited, and a batch-type degreasing furnace may be used; however, in order to continuously carry out the process, a continuous furnace provided with a belt conveyor is preferably used. The degreasing process is preferably carried out by conducting a drying process at a set temperature of at least about 200° C. and at most about 600° C. under normal atmosphere for at least about 1 hour and at most about 5 hours.

In the method for manufacturing the honeycomb structure according to the present embodiment, an acid treatment may be carried out on the pillar-shaped molded body manufactured through the above-mentioned method. By carrying out the acid treatment, the heat resistance of the molded body can be improved. The acid treatment is carried out by immersing the molded body in a solution such as a hydrochloric acid solution and a sulfuric acid solution.

With respect to the conditions of the acid treatment, in the case where inorganic glass is used as the inorganic material, the concentration of the treatment solution is preferably at least about 1 mol/l and at most about 10 mol/l, the treating time is preferably at least about 0.5 hours and at most about 24 hours, and the treatment temperature is preferably at least about 70° C. and at most about 100° C. By carrying out the acid treatment under these conditions, components other than silica are eluted so that the heat resistance of the molded body is consequently improved.

The above-mentioned acid treatment process may be carried out during heating treatment processes. More specifically, the following processes are preferably carried out: a primary firing process is carried out at about 950° C. for about 5 hours, and the acid treatment is then carried out, and a heating treatment is again carried out at about 1050° C. for about 5 hours as a secondary firing process. These processes are more likely to further improve the heat resisting property of the molded body.

In the present embodiment, by laminating a honeycomb structure and a lamination member for an end portion, it becomes easier to manufacture a honeycomb filter functioning as a filter, in which either of two end portions of each cell is sealed.

Figure 4A:
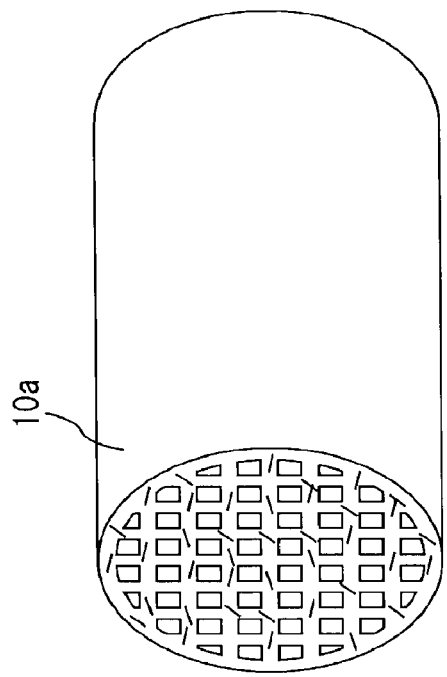
FIG. 4A is a perspective view that shows the honeycomb structure and the lamination members forming the honeycomb filter according to embodiment of the present invention.
Figure 4B:
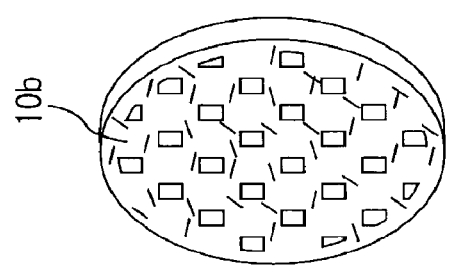
FIG. 4B is a perspective view that shows a state in which the honeycomb structure and the lamination members shown in FIG. 4A are laminated to manufacture the honeycomb filter.
Figure 4B:
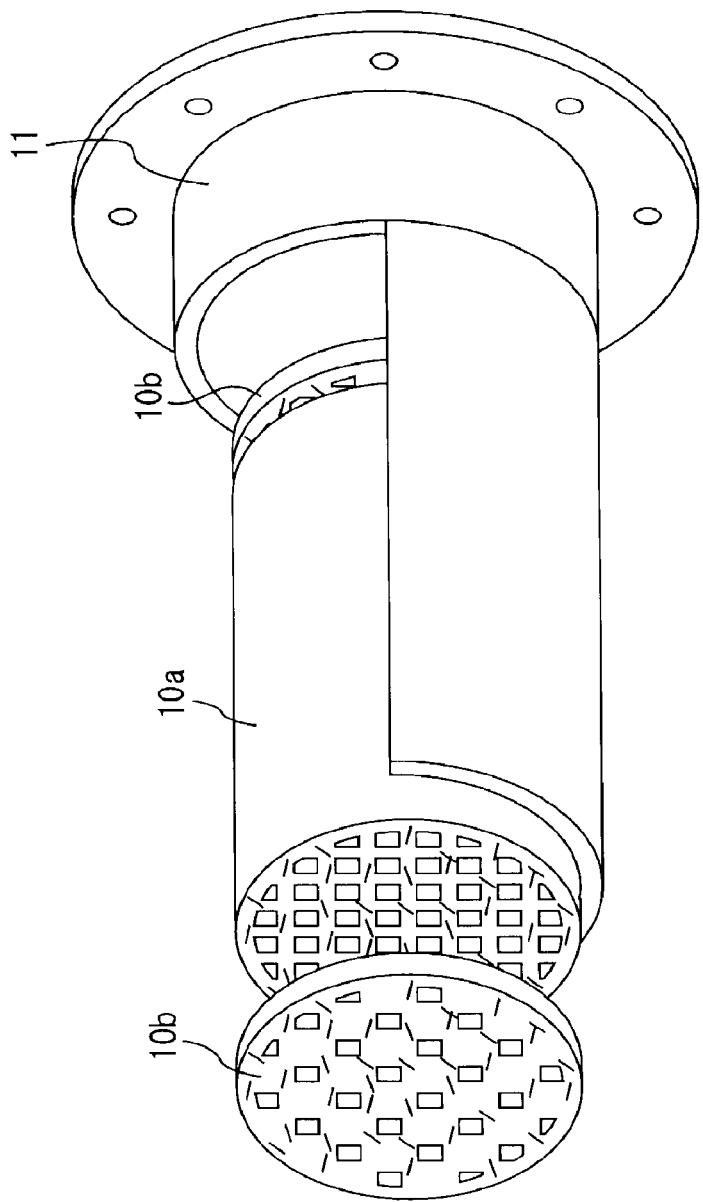

More specifically, as illustrated in FIG. 4B, by using a cylindrical casing 11 (can-type metal container) with a pressing metal member on one side, the lamination member for an end portion 10b is firstly laminated in the casing 11, and the honeycomb structure 10a manufactured, for example, according to the embodiment of the present invention is installed thereon. Lastly, the lamination member 10b for an end portion is laminated, and thereafter a pressing metal member is attached and fixed also on the other side the casing 11 so that the honeycomb structure on which processes up to a canning process have been carried out can be manufactured. With respect to the material for the casing, for example, metal materials such as stainless steel (SUS), aluminum and iron may be used. Although not particularly limited, the shape of the casing is preferably a shape similar to the outer shape of the honeycomb structure to be housed.

With respect to the lamination member for an end portion, it is preferable to laminate a lamination member for an end portion comprising metal with predetermined through holes formed therein. With this arrangement, it is possible to manufacture a honeycomb filter in which the lamination member for an end portion mainly comprising metal is laminated on both sides of the honeycomb structure.

As the lamination member for an end portion, a lamination member for an end portion comprising inorganic fibers may be laminated. The lamination member for an end portion comprising inorganic fibers may be manufactured by the same method as the above-mentioned method of manufacturing the honeycomb structure, except that the shape of the holes formed in a die in the extrusion-molding process in the method for manufacturing the honeycomb structure is changed so that a molded body having cells formed in a checkered pattern is manufactured, and the resulting molded body is thinly cut in the cutting process.

The method for manufacturing the lamination member for an end portion comprising metal is described below.

A laser machining process or a punching process is carried out on a porous metal plate mainly comprising metal having a thickness of at least about 0.1 mm and at most about 20 mm so that a lamination member for an end portion with through holes formed in a checkered pattern can be manufactured.

Thereafter, an oxide catalyst is supported on the honeycomb structure so that a catalyst supporting honeycomb is manufactured.

First, a solution of a precursor of a catalyst is prepared. Preferable examples of the precursor of the catalyst include those that become any of $CeO_2$, $ZrO_2$, $FeO_2$, $Fe_2O_3$, $CuO$, $CuO_2$, $Mn_2O_3$, $MnO$, $K_2O$, and a composite oxide represented by a composition formula $A_nB_{1-n}CO_3$ (in which A represents La, Nd, Sm, Eu, Gd or Y; B represents an alkali metal or an alkali earth metal; C represents Mn, Co, Fe or Ni), after such precursors are condensed, thermally decomposed, and crystallized in the later process. One kind of these precursors may be used, or two or more kinds thereof may be used in combination. More specifically, for example, nitrate salt, carbonate salt, acetate salt and the like containing a metal element of the oxide can be used, and the examples thereof include a metal complex body represented by a general formula $M(OR^1)_p(R^2COCHCOR^3)_q$ (in the formula, M represents one member selected from the group consisting of Ce, Zr, Fe, Cu, Mn and K; p and q each represents an integer number determined so that the metal complex has a 2 to 8 coordinate structure, and either p or q may be 0; when the number of each of $R^1$, $R^2$ and $R^3$ is two or more, then $R^1$, $R^2$, $R^3$ may be respectively the same as or different. $R^1$ and $R^2$ each represents an alkyl group having 1 to 6 carbon atoms, and $R^3$ represents an alkyl group having 1 to 6 carbon atoms and/or an alkoxy group having 1 to 16 carbon atoms), and the like. Examples of solvent include water, an organic solvent such as toluene and alcohol, and the like.

The above-mentioned solution is dispersed in a gas by a known spraying method and the like. When the dispersion is carried out in such a manner that the dispersed droplets have a constant size, then the particle diameter of the oxide catalyst to be supported on the honeycomb structure in a later process can be adjusted to a constant size.

Next, the gas including the dispersed solution of the precursor is transported by a carrier gas to flow into one of the ends of the honeycomb structure 10a. At this time, the influx speed of the carrier gas is preferably almost the same as the speed of actual exhaust gases from an engine and may be, for example, about 72,000 (1/h) in terms of space velocity. The carrier gas is flowed into one of the ends of the honeycomb structure and flowed out from the adjacent cell after passing through a cell wall. On this occasion, the solution of the precursor dispersed and mixed in the carrier gas is adhered to the cell walls of the honeycomb structure 10a.

Further, by heating the honeycomb structure at a temperature of at least about 300° C. and at most about 800° C., the precursor of the catalyst attached to the cell walls is condensed, thermally decomposed and crystallized, and is supported on the honeycomb structure as an oxide catalyst.

The oxide catalyst is supported preferably in such a manner that the carrier gas is flowed into the honeycomb structure 10a while the honeycomb structure 10a is heated so that adhesion of the solution of the precursor as well as condensation, thermal decomposition and crystallization of the precursor are performed simultaneously. With this arrangement, the precursor of the catalyst is adhered to the honeycomb structure as catalyst particles, and thus tends to be more evenly supported.

EXAMPLES

Example 1

First, 11.8% by weight of silica-alumina fibers configured by 72% of alumina and 28% of silica (average fiber length: 0.3 mm, average fiber diameter: 5 μm), 5.9% by weight of glass fibers (average fiber diameter: 9 μm, average fiber length: 0.1 mm), 17.0% by weight of methyl cellulose as organic binder, 4.6% by weight of acrylic resin, 7.8% by weight of a lubricant (UNILUB, made by NOF Corporation), 3.7% by weight of a glycerin and 49.2% by weight of water were mixed and sufficiently stirred so as to prepare a mixture.

Next, the mixture was charged into a cylinder of a plunger-type molding machine, and a piston was pressed and shoved into the die side so that the mixture was extruded through the die, thereby a raw molded body was manufactured. The raw molded body was then dried at 200° C. for 3 hours by a microwave drying apparatus and a hot-air drying apparatus to remove moisture in the molded body. Next, heating treatment was carried out on the molded body in an electric furnace at 400° C. for 3 hours so that organic matters contained in the molded body were removed.

Further, a heating treatment was carried out on the molded body in a firing furnace at 950° C. for 5 hours, and thereafter, acid treatment was carried out by immersing the molded body into a 4 mol/L HCl solution of 90° C. for 1 hour and further a heating treatment was carried out at 1050° C. for 5 hours so that a honeycomb structure primarily comprising inorganic fibers having a size of φ30 mm×48 mm was obtained. In this honeycomb structure, the porosity of the cell walls was 93%, the average pore diameter of the cell walls was 45 μm, the cell density was 8.5 cells/cm$^2$ (55 cpsi); and the thickness of the cell walls was 1.27 mm.

Next, a metal plate made of Ni—Cr alloy was processed in a round disk shape having a size of φ30 mm×1 mm, and holes were formed therein by a laser processing so that two plates of lamination members for an end portion, having different sealed portions with one another, of the honeycomb structure were manufactured.

One of the lamination members for an end portion was installed in the cylindrical casing (can-type), and the honeycomb structure was placed thereon in such a manner that the positions of holes of the lamination member for an end portion fit to the positions of cells of the honeycomb structure. Further, the other lamination member for an end portion was also installed thereon in such a manner that the positions of holes thereof fit to the positions of the cells of the honeycomb structure, and the lamination member for an end portion was welded to the casing, thereby a honeycomb filter with a length of 50 mm was manufactured.

Next, an oxide catalyst was supported on the obtained honeycomb structure (honeycomb filter).

First, cerium nitrate was dissolved in water to prepare a solution of a precursor of $CeO_2$. A gas in which the solution of the precursor was dispersed was transported by a carrier gas so as to be flowed into one of the ends of the honeycomb filter. Here, the speed of the carrier gas was adjusted to a space velocity of 72000 (1/h). In this manner, a catalyst supporting honeycomb in which $CeO_2$ having an average particle diameter of 0.1 μm are supported on the honeycomb structure comprising inorganic fibers was obtained. Here, the amount of the $CeO_2$ was adjusted to 20 g per 1 L of the catalyst supporting honeycomb. Measurement of the average particle diameter of the oxide catalyst was performed by using SEM photographs.

Comparative Example 1

First, 54.6% by weight of silicon carbide in a form of coarse powder having an average particle diameter of 22 μm, 23.4% by weight of silicon carbide in a form of fine powder having an average particle diameter of 0.5 μm, 4.3% by weight of methyl cellulose as organic binder, 2.6% by weight of a lubricant (UNILUB, made by NOF Corporation), 1.2% by weight of glycerin, and 13.9% by weight of water were mixed and kneaded to obtain a mixture. Thereafter, the mixture was extrusion-molded so as to manufacture a raw molded body.

Next, the raw molded body was dried by using a microwave drying apparatus and the like to form a dried body, followed by filling of a plug material paste having the same composition as that of the raw molded body into the predetermined cells.

Further, after again dried by a drying apparatus, the resulting product was degreased at 400° C. and then fired at 2200° C. under a normal-pressure argon atmosphere for 3 hours so as to manufacture a honeycomb structure formed by a silicon carbide sintered body with a porosity of cell walls of 42%, an average pore diameter of 11.0 μm, a size of φ30 mm×50 mm, the number of cells of 46.5 pcs/cm$^2$ (300 cpsi) and a thickness of the cell walls of 0.25 mm.

Next, an oxide catalyst was supported on the honeycomb structure in the same manner as in Example 1, thereby a catalyst supporting honeycomb was obtained. Here, the average particle diameter of $CeO_2$ was 0.1 μm, and the support amount was 20 g/L.

Comparative Example 2

A honeycomb structure was manufactured in the same manner as Example 1. The honeycomb structure was immersed in a solution containing 10 g of $CeO_2$, 40 ml of water and a pH adjusting agent for 5 minutes, and a firing treatment was carried out on the resulting honeycomb structure at 500° C. so that a honeycomb structure on which a catalyst is supported, having $CeO_2$ supported thereon was manufactured. Here, the average particle diameter of the supported $CeO_2$ was 2 μm, and the support amount was 20 g/L. The thus obtained honeycomb structure on which a catalyst is supported was installed in the casing together with the lamination members for an end portion in the same manner as in Example 1, thereby a catalyst supporting honeycomb was manufactured.

(Evaluation Method)

A 2 L common rail engine was driven at a rotational speed of 1500 rpm with a torque of 47 Nm, and exhaust gases thus generated were allowed to flow into the catalyst supporting honeycomb that was placed in a branched pipe. Here, it was arranged to make it possible to heat the site where the catalyst supporting honeycomb was placed by a heating device. The catalyst supporting honeycomb was heated up to 350° C. by the heating device, and the flow rate of the exhaust gases was set to 2.9 cm/s for the catalyst supporting honeycomb according to Comparative Example 1, and was set to 18 cm/s for the catalyst supporting honeycomb according to Example 1 and Comparative Example 2 so that a differential pressure between the front and the back of the respective catalyst supporting honeycombs was measured. The results are as shown in FIG. 5.

Figures 5, 6:
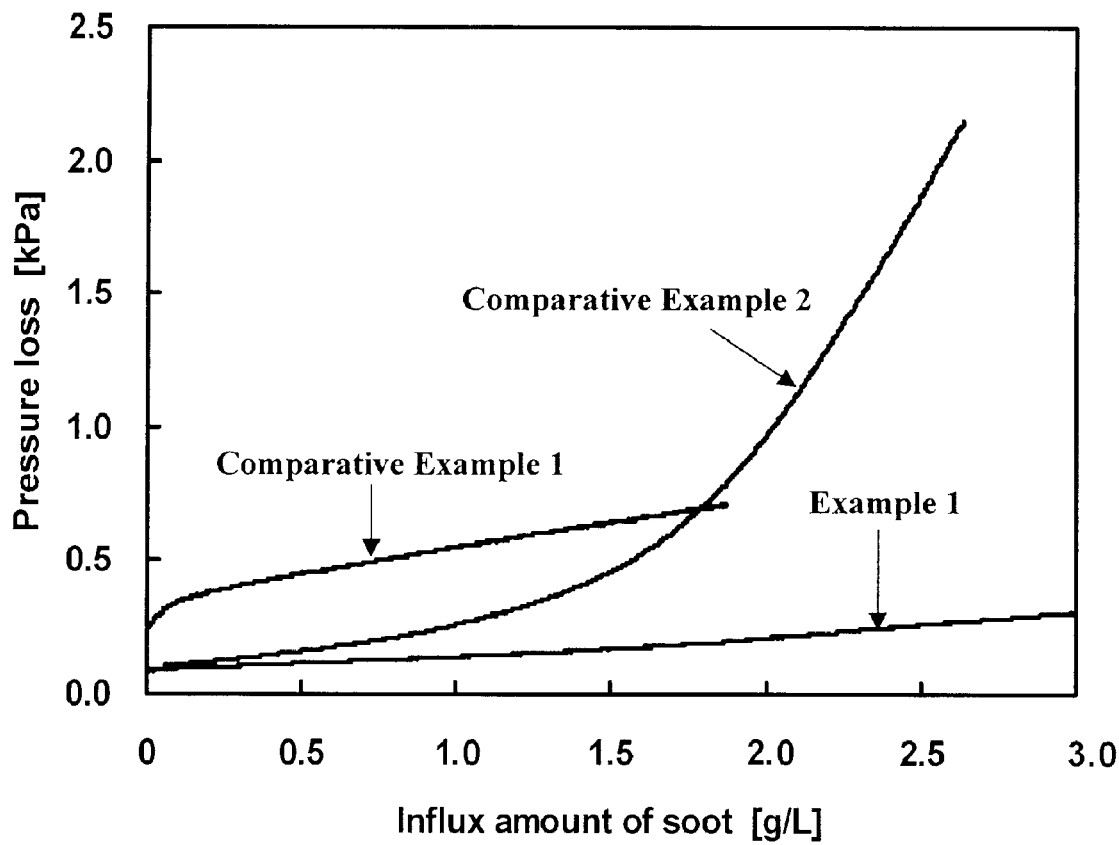
FIG. 5 is a graph that shows a relationship between influx amount of soot and pressure loss.
FIG. 6 is a table graph that shows the prescribed temperatures of filters and the flow rate of gases flowing into the filters.

On the other hand, the prescribed temperatures and the flow rate were set as shown in FIG. 6, and the continuous regeneration performance for soot was evaluated according to the following equation.

$$\text{mcont\_reg} = (\text{min} - \text{maccum} - \text{mout})/t$$

In the above equation, each abbreviation refers to the following:

mcont_reg: amount (g) of soot that was continuously regenerated, min: amount (g) of soot introduced to catalyst supporting honeycomb, maccum: amount (g) of soot accumulated on catalyst supporting honeycomb, mout: amount (g) of soot leaked out from catalyst supporting honeycomb, and t: time (min).

Figure 7:
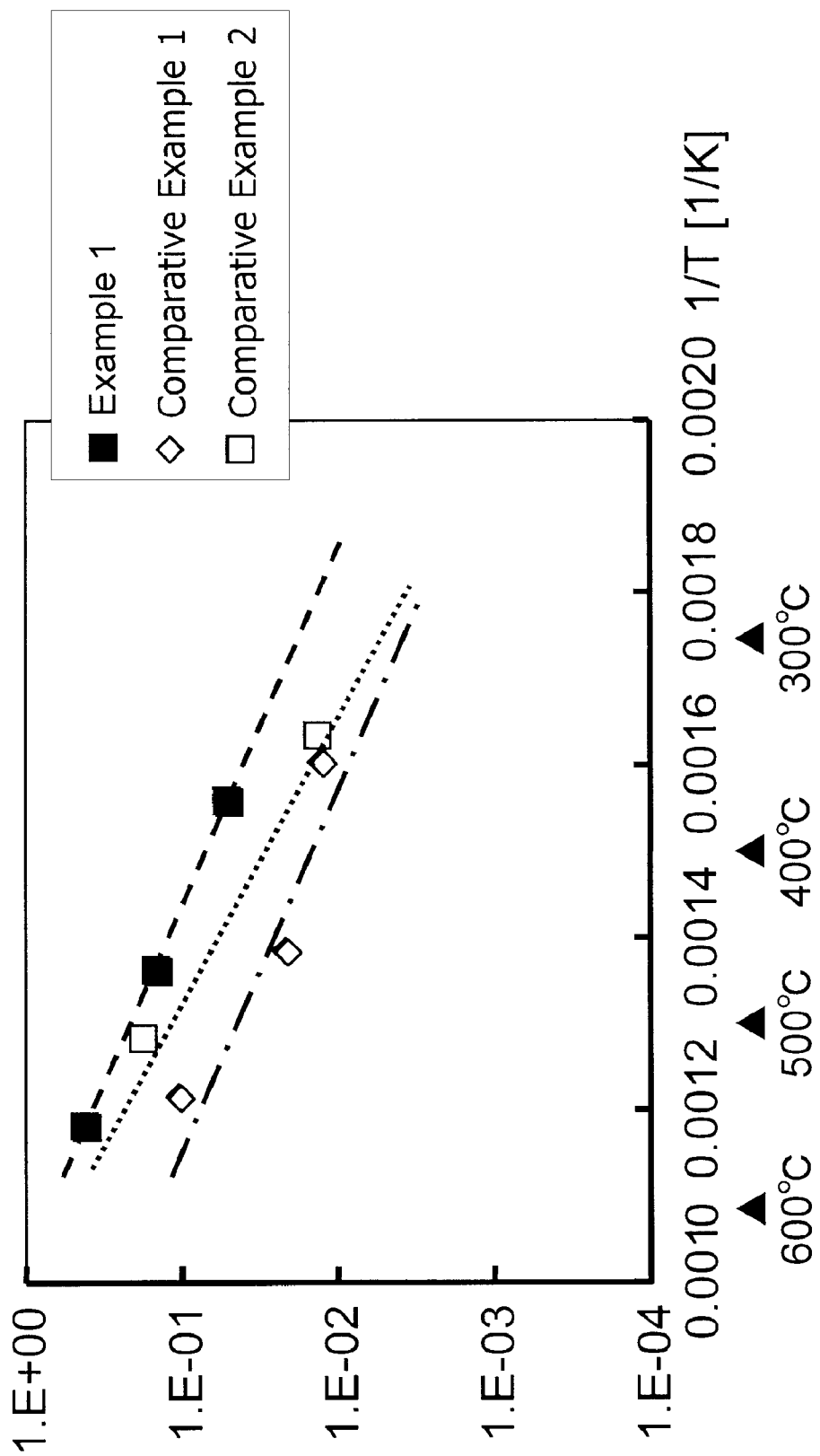
FIG. 7 is a graph that shows oxidation rate of soot by Arrhenius plot.

The results are shown in FIG. 7 in Arrhenius plot (the logarithms of the both sides of the oxidizing velocity formula of C (carbon) shown by the formula below were obtained, and the oxidation rate (g/m²/min) of C is described on the vertical axis and the reciprocals of temperatures (K) are described on the horizontal axis).

$$C + O_2 \rightarrow CO_2$$

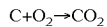

$$K = A \cdot [C(s)] \cdot P[O_2] e^{-E/RT}$$

In the above-mentioned formula, each abbreviation refers to the following: A: frequency factor, [C(s)]: concentration of solid matter C, P[O₂]: amount of oxygen, E: Activation energy, R: Gas constant, and T: Reaction temperature.

As compared with the catalyst supporting honeycomb of Comparative Example 1, the catalyst supporting honeycomb of Example 1, which mainly includes inorganic fibers, has a high porosity, and therefore an increase with time in pressure loss in relation to the amount of soot that had been flowed in can more easily be maintained at a low level. This is because, by allowing soot to flow into deep portions of the cell walls, soot can more easily be contacted with the catalysts supported inside the cell walls. As a result of this, the soot flowed into the catalyst supporting honeycomb can more easily be burned continuously, and thus a time period before forced regeneration can more easily prolonged.

In the catalyst supporting honeycomb of Example 1, an average particle diameter of the catalyst is at least about 0.05 μm and at most about 1.00 μm, which is smaller as compared with the catalyst supporting honeycomb of Comparative Example 2. Therefore, the activity points between soot and the catalyst are increased, and soot can more easily be burned continuously. On the other hand, since the activity points between soot and the catalyst are few in the catalyst supporting honeycomb of Comparative Example 2, soot tends to easily accumulate and tends to plug pores in the deep portions. As a result of this, pressure loss is more likely to increase significantly.

Other Embodiments

In the above, the embodiment according to the present invention has been described; however, the present invention should not be construed as limited to the embodiment. The present invention can be applicable to various embodiments as long as they are within the scope of the gist of the invention.

In the first embodiment mentioned above, the honeycomb structure 10a formed by a single member was exemplified. However, a honeycomb structure may be configured by a plurality of plate-like lamination members which are laminated in such a manner that the cells of each lamination member are aligned with the cells of the other lamination members.

What is claimed as new and desired to be secured by Letters Patent of the United States is:

1. A catalyst supporting honeycomb comprising:
   a pillar-shaped honeycomb structure having a plurality of cells formed in parallel with one another in a longitudinal direction with a cell wall interposed therebetween; and
   catalyst particles supported on the honeycomb structure,
   said honeycomb structure having an integral honeycomb structure comprising a single member obtained by extrusion-molding a mixture comprising inorganic fibers and an inorganic material, said inorganic material melting at a temperature of a heat-resistant temperature of the inorganic fibers or lower, a porosity of said cell wall being about 70% or more,
   said catalyst particles being configured by an oxide catalyst having an average particle diameter of at least about 0.05 μm and at most about 1.00 μm,
   wherein said inorganic fibers are fixed to each other through the inorganic material at intersection portions of the inorganic fibers, and
   wherein said inorganic material is present locally at said intersection portions of the inorganic fibers.

2. The catalyst supporting honeycomb according to claim 1,
   wherein
   either of two end portions of each of said cells is sealed.

3. The catalyst supporting honeycomb according to claim 1,
   wherein
   said honeycomb structure is formed by a plurality of lamination members laminated with one another in a longitudinal direction, and
   said lamination members are laminated so that the cells of each lamination member are aligned with the cells of the other lamination members.

4. The catalyst supporting honeycomb according to claim 1,
   wherein
   said oxide catalyst is at least one member selected from the group consisting of $CeO_2$, $ZrO_2$, $FeO_2$, $Fe_2O_3$, $CuO$, $CuO_2$, $Mn_2O_3$, $MnO$, $K_2O$, and a composite oxide represented by a composition formula $A_nB_{1-n}CO_3$ in which A represents La, Nd, Sm, Eu, Gd or Y; B represents an alkali metal or an alkali earth metal; and C represents Mn, Co, Fe or Ni.

5. A catalyst supporting honeycomb comprising:
   a pillar-shaped honeycomb structure having a plurality of cells formed in parallel with one another in a longitudinal direction with a cell wall interposed therebetween, said honeycomb structure having an integral honeycomb structure comprising a single member obtained by extrusion-molding a mixture comprising inorganic fibers and an inorganic material, said cell wall comprising inorganic fibers and an inorganic material, said inorganic material melting at a temperature of a heat-resistant temperature of the inorganic fibers or lower, a porosity of said cell wall being about 70% or more, and oxide catalyst particles supported on the cell wall, said oxide catalyst particles being supported by flowing a gas containing a dispersed solution of a precursor of the oxide catalyst into the honeycomb structure, wherein said oxide catalyst particles have an average particle diameter of at least about 0.05 µm and at most about 1.00 µm, wherein said inorganic fibers are fixed to each other through the inorganic material at intersection portions of the inorganic fibers, and wherein said inorganic material is present locally at said intersection portions of the inorganic fibers.

* * * * *